UNITED STATES PATENT OFFICE.

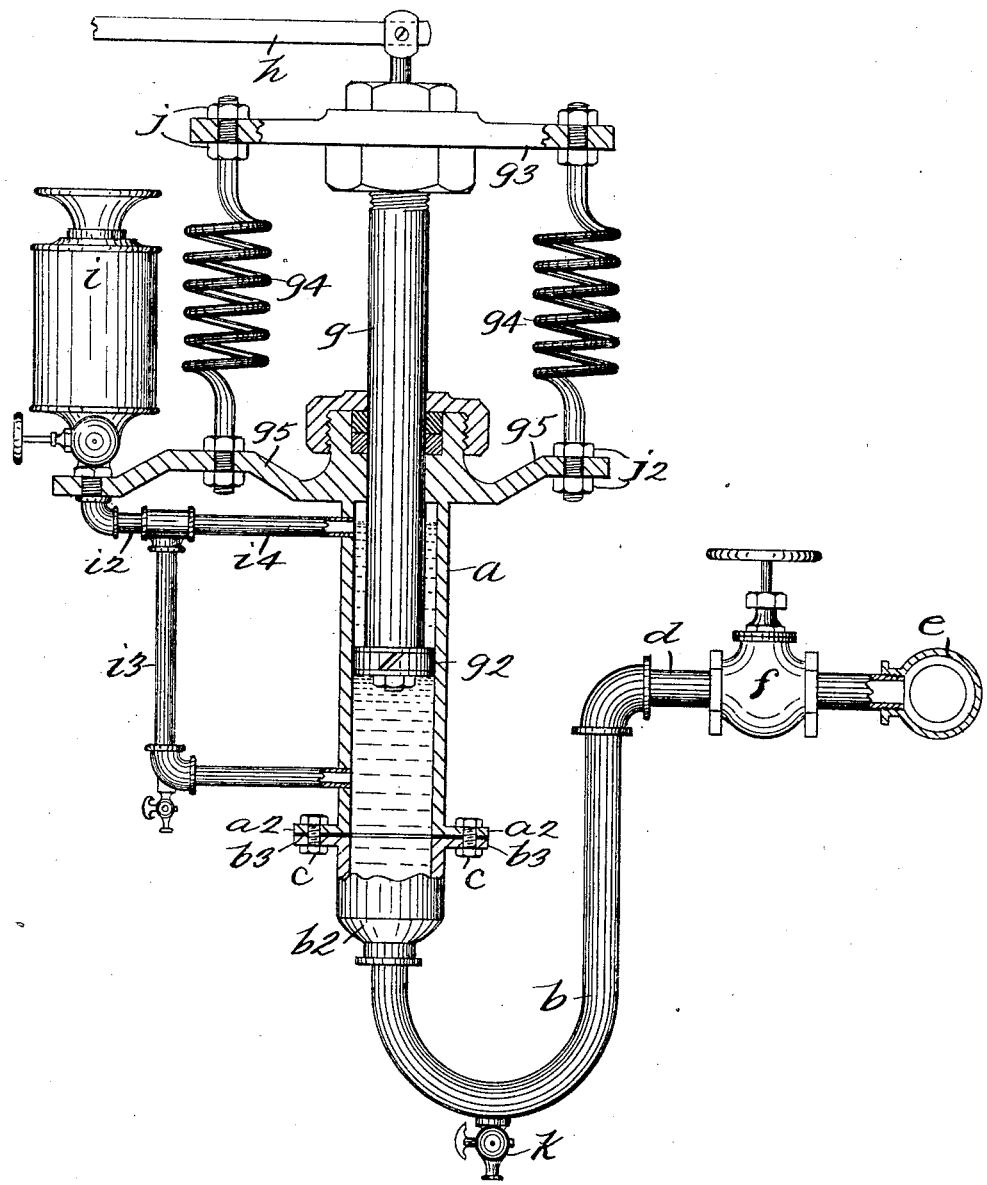

CHARLES P. McMULLEN, OF BROOKLYN, NEW YORK, ASSIGNOR OF ONE-HALF TO WILLIAM E. NYE, OF WAREHAM, MASSACHUSETTS.

GOVERNOR FOR PUMPING-ENGINES.

No. 810,666.  Specification of Letters Patent.  Patented Jan. 23, 1906.

Application filed October 4, 1905. Serial No. 281,281.

*To all whom it may concern:*

Be it known that I, CHARLES P. McMULLEN, a citizen of the United States, residing at Brooklyn, in the county of Kings and State of New York, have invented certain new and useful Improvements in Governors for Pumping-Engines, of which the following is a specification, such as will enable those skilled in the art to which it appertains to make and use the same.

This invention is an improvement on the governor for pumping-engines described and claimed in Letters Patent of the United States granted to me November 8, 1904, No. 774,266, and reissued January 10, 1905, No. 12,302.

The invention is fully disclosed in the following specification, of which the accompanying drawing forms a part, in which the separate parts of my improvement are designated by suitable reference characters, said drawing being a sectional side elevation of an apparatus involving my invention.

The patent hereinbefore referred to relates to improvements in the governors for pumping-engines whereby the cylinders of said governors may be kept thoroughly lubricated at all times, and in said patent there is shown and described a complete apparatus of the class specified comprising a pump, a steam-supply pipe connected therewith, a main water-pipe connected with the pump, a governor-cylinder connected with the main water-pipe, a piston placed in said cylinder and provided with a rod, a device in operative connection with said rod and with said steam-supply pipe whereby the piston is operated in one direction by the pressure of water in the main water-pipe and in the other direction by the pressure of steam in the steam-supply pipe, and there is also described and claimed in said patent means for supplying a lubricant to the cylinder.

The invention which forms the basis of this application is an improvement on the means for supplying a lubricant to the cylinder and in means for holding said lubricant in proper position at all times, and in the drawing forming part of this specification I have only shown those features of the construction which are necessary to illustrate the improvement described and claimed herein.

In the drawing forming part of this specification I have shown at $a$ the cylinder of the governor of a pumping-engine, and in the practice of my invention I secure to the end thereof the U-shaped trap $b$. One side of the trap $b$ is provided with a coupling-head $b^2$, which is similar in form to the form of the lower end of the cylinder $a$, and said cylinder and said coupling-head are provided, respectively, with flanges $a^2$ and $b^3$, which are bolted or otherwise secured together, as shown at $c$. The other side of the trap $b$ is connected with a supplemental water or coupling pipe $d$, which in turn is connected with a main water-pipe $e$, with which in practice the pump is connected, said pump being not shown, and the supplemental or coupling pipe $d$ is provided with a valve $f$. The cylinder $a$ in the form of construction shown is arranged vertically, and passing through the upper end thereof is a piston-rod $g$, provided with a piston $g^2$, which works freely in the cylinder $a$, and the piston-rod $g$ is provided at its upper end with a cross-head $g^3$, with which are connected spiral springs $g^4$, which are also vertically arranged and connected with arms $g^5$, which extend in opposite directions from the head of the cylinder $a$. The rod $g$ is also connected at its upper end with an arm or lever $h$, which in practice is in operative connection with the throttle-valve of the steam-pipe which supplies steam to the engine, none of which are shown; but these parts are all shown and described in the patent hereinbefore referred to and form no part of this invention. I also mount at any suitable point and on any suitable support an oil-supply tank or cup $i$, which in the form of construction shown is connected with the lower end portion of the cylinder $a$ by means of a pipe or pipes $i^2$ and $i^3$, and a supplemental pipe $i^4$ forms a by-pass which communicates with the upper end portion of the cylinder $a$.

It will be understood that the springs $g^4$ hold the piston $g^2$ in its proper position, and the tension of these springs may be regulated at any time by means of the nuts $j$ and $j^2$, with which they are provided at each end, or in any desired manner, and when the pump is in operation the water will be forced through the pipe $e$, and if at any time the pressure in said pipe reaches or exceeds a predetermined amount the piston $g^2$ will be operated and the throttle-valve of the steam-supply pipe will be closed and the steam-supply to the pump will be cut off, and this action, as will be understood, is automatic at all times. As soon as the pressure in the pipe $e$ is lowered beyond the said predetermined point the operation of the piston $g^2$ will be reversed and the steam will again pass through the throttle-valve and to the pump and the operation of the pump will be renewed. As hereinbefore stated, however, this invention only relates to the cylinder $a$ and means for supplying oil or a suitable lubricant thereto, and by means of the construction herein shown and described it will be seen that there is a constant supply of oil to the cylinder $a$ both above and below the piston $g^2$, and the rod $g$ is of such dimensions that the bottom surface of said piston is much greater than the top thereof, and this facilitates the operation of said piston, as will be readily understood. The oil above the piston also forms a cushion which regulates to some extent the movement of the piston and prevents the violent or jerking movement which is an objection to apparatus of this class as usually constructed. The trap $b$ is employed in order to retain the oil or body of oil in proper position for use in the lower end of the cylinder $a$ at all times without the necessity of recharging the said lower end of the cylinder, and the said trap also prevents the oil from passing out or being forced out through the pipe $g$ and $e$ if at any time said pipes should be broken or open to the full capacity of the discharge of the pump, and the bottom portion of the trap forms a retainer or reservoir from which the oil cannot pass when the apparatus is in operative position or condition. The bottom portion of the trap is also preferably provided with a draw-off $k$, which may be employed if at any time it is desirable to clean said trap.

It will be understood that whenever the apparatus is in operation the water is forced through the pipe $d$ into the trap $b$ and the oil therein rises in the cylinder $a$, and this oil, together with the oil above the piston $g^2$, keeps the cylinder $a$ in a perfect state of lubrication at all times.

My invention is not limited to any particular means of supplying oil to the lower end portion of the cylinder $a$, and said oil may be supplied to the trap $b$, if desired, instead of to the lower end portion of said cylinder, it being understood that any means for supplying oil either to the trap $b$ or to the lower end portion of the cylinder $a$ would accomplish the same result, as this oil under all conditions is either retained in said trap or in the cylinder $a$.

Having fully described my invention, what I claim as new, and desire to secure by Letters Patent, is—

1. The combination with the cylinder of the governor of a pumping-engine of a trap connected with one end of said cylinder and with the main water-pipe of the pump, and means for supplying oil to the said end of said cylinder and said trap, substantially as shown and described.

2. The combination with the cylinder of the governor of a pumping-engine of a trap connected with one end of said cylinder and with the main water-pipe of the pump, and means for supplying oil to the said end of said cylinder and said trap, and also to the opposite end of said cylinder, substantially as shown and described.

3. In an apparatus of the class described, a cylinder, a trap connected with one end thereof, a piston movable in said cylinder, and means for supplying oil to both ends of said cylinder, substantially as shown and described.

4. In an apparatus of the class described, a vertically-arranged cylinder, a trap connected with the lower end thereof, and means for supplying oil to the upper end of said cylinder, and to the lower end portion thereof which is connected with said trap, substantially as shown and described.

5. In a governor for pumping-engines, a cylinder, a trap connected with one end thereof and also in operative connection with the water-pipe of the pump, and means for supplying oil to said trap, substantially as shown and described.

6. In a governor for pumping-engines, a cylinder, a trap connected with one end thereof and also in operative connection with the water-pipe of the pump, and means for supplying oil to said trap, and also to the opposite end of said cylinder, substantially as shown and described.

In testimony that I claim the foregoing as my invention I have signed my name, in presence of the subscribing witnesses, this 3d day of October, 1905.

CHARLES P. McMULLEN

Witnesses:
F. A. STEWART,
C. J. KLEIN.